United States Patent
He et al.

(10) Patent No.: US 7,617,103 B2
(45) Date of Patent: Nov. 10, 2009

(54) INCREMENTALLY REGULATED DISCRIMINATIVE MARGINS IN MCE TRAINING FOR SPEECH RECOGNITION

(75) Inventors: Xiaodong He, Issaquah, WA (US); Alex Acero, Bellevue, WA (US); Dong Yu, Kirkland, WA (US); Li Deng, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 505 days.

(21) Appl. No.: 11/509,980

(22) Filed: Aug. 25, 2006

(65) Prior Publication Data

US 2008/0052075 A1    Feb. 28, 2008

(51) Int. Cl.
*G10L 15/14* (2006.01)
(52) U.S. Cl. ............... 704/256; 704/244; 704/243
(58) Field of Classification Search .............. 704/256, 704/255, 256.1, 234, 236, 243, 244, 270, 704/231

See application file for complete search history.

(56) References Cited

U.S. PATENT DOCUMENTS

| | | | |
|---|---|---|---|
| 6,308,155 B1 * | 10/2001 | Kingsbury et al. | 704/256.1 |
| 6,341,264 B1 * | 1/2002 | Kuhn et al. | 704/255 |
| 7,219,055 B2 * | 5/2007 | Lucke | 704/234 |
| 2005/0021337 A1 * | 1/2005 | Kwon | 704/256 |

* cited by examiner

*Primary Examiner*—Huyen X. Vo
(74) *Attorney, Agent, or Firm*—Theodore M. Magee; Westman, Champlin & Kelly, P.A.

(57) ABSTRACT

A method and apparatus for training an acoustic model are disclosed. A training corpus is accessed and converted into an initial acoustic model. Scores are calculated for a correct class and competitive classes, respectively, for each token given the acoustic model. From this score a misclassification measure is calculated and then a loss function is calculated from the misclassification measure. The loss function also includes a margin value that varies over each iteration in the training. Based on the calculated loss function the acoustic model is updated, where the loss function with the margin value is minimized. This process repeats until such time as an empirical convergence is met.

12 Claims, 7 Drawing Sheets

INCREMENTALLY REGULATED DISCRIMINATIVE MARGINS IN MCE TRAINING FOR SPEECH RECOGNITION

BACKGROUND

Discriminative training has been a prominent theme in recent speech recognition research and system development. The essence of these discriminative training algorithms is the adoption of various cost functions that are directly or indirectly related to the empirical error rate found in the training data. These cost functions serve the objective functions for optimization, and for the related empirical error rate that may either be calculated at the sentence string level, at the super-string level, at the sub-string level, or at the isolated word/phone token level.

For example, one approach that has been found during research is that when the empirical training error rate is optimized through the use of a classifier or recognizer, only a biased estimate of the true error rate is obtained. The size of this bias depends on the complexity of the recognizer and the task (as quantified by the VC dimension). Analysis and experimental results have shown that this bias can be quite substantial even for a simple Hidden Markov Model recognizer applied to a simple single digit recognition task. Another key insight from the machine learning research suggests that one effective way to reduce this bias and improving generalization performance is to increase "margins" in the training data. That is, making the correct samples classified well away from the decision boundary. Thus, it is desirable to use such large margins for achieving lower test errors even if this may result in higher empirical errors in training. Previous approaches to discriminative learning techniques and speech recognition have focused on the issue of the empirical error rate. These have not focused on the issue of margins or the related generalization.

The discussion above is merely provided for general background information and is not intended to be used as an aid in determining the scope of the claimed subject matter.

SUMMARY

A method and apparatus for training an acoustic model are disclosed. Depending on the type of acoustic model being trained, (i.e. customized to each user or general) a training corpus is provided to a training model. This training corpus can be either commercially available training corpuses or can be generated by the user. This training corpus is then accessed and an initial acoustic model is created using the training set. Once an initial acoustic model is created scores are calculated for each token in the correct class and competitive classes. From these scores, loss values can be calculated based on a loss function. The loss function includes a margin value that moves a decision boundary for empirical convergence. The margin can either be a fixed margin or can vary depending on the number of iterations performed. Based on the calculated loss values the acoustic model is updated. This process repeats until such time as an empirical convergence is met.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
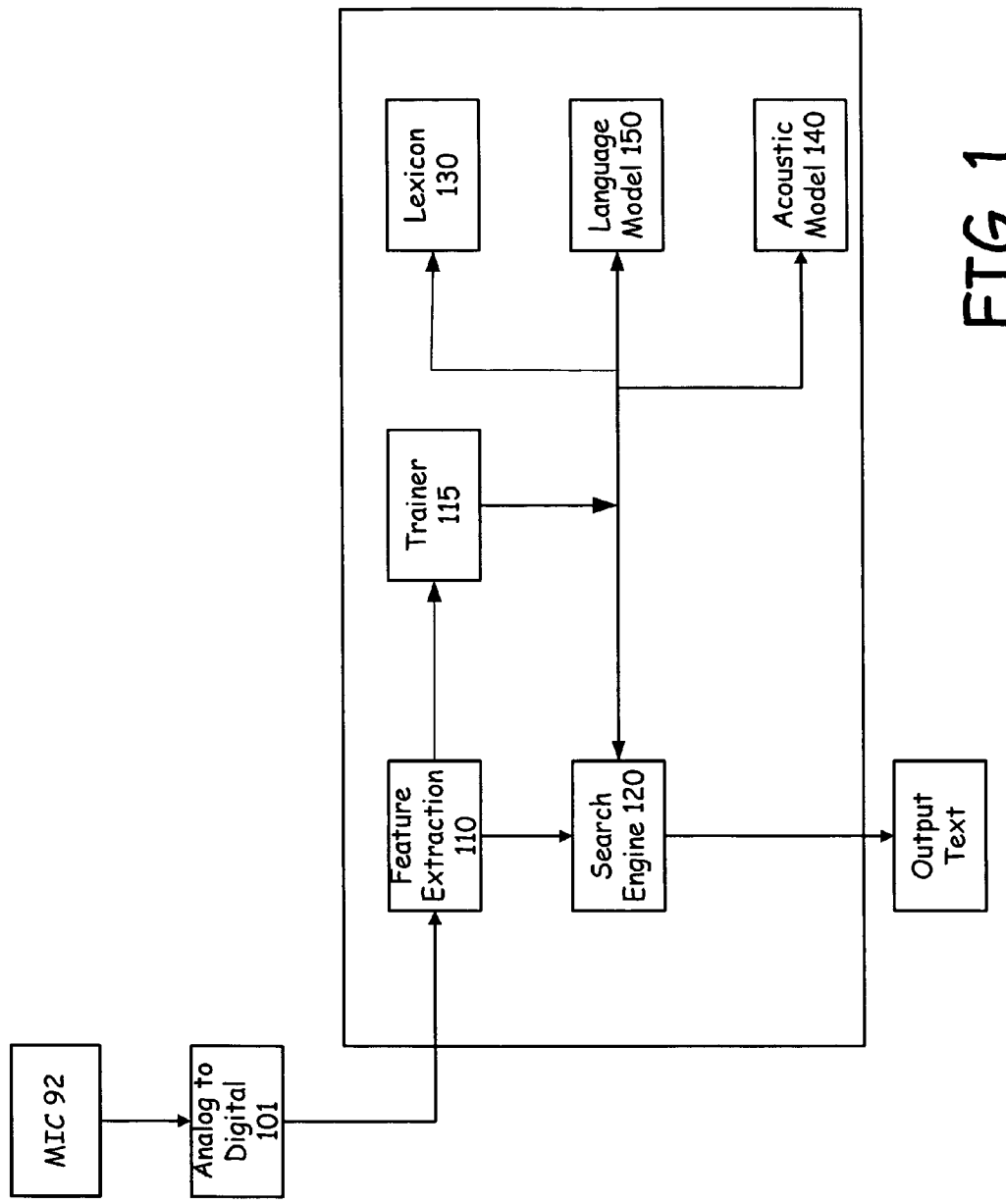
FIG. 1 is a block diagram of an exemplary speech recognition system.

FIG. 1 is a block diagram illustrating exemplary speech recognition 100 according to one embodiment. The speech recognition system 100 includes a microphone 92, an analog-to-digital (A/D) converter 101, a training module 115, a feature extraction module 110, a lexicon storage module 130, an acoustic model 140, a tree search engine 120, and a language model 150. It should be noted that the entire system 100, or part of speech recognition system 100, can be implemented on any computer system or across multiple computer systems. For example, microphone 92 can preferably be provided as an input device to the computer through an appropriate interface, and through the A/D converter 101.

The training module 115 and the feature extraction module 110 can either be hardware modules in the computer system, or software modules stored in any information storage device. This information is accessible by a processing unit on the computer or any other suitable processor. In addition, the lexicon storage module 130, the acoustic model 140, and the language model 150 are also preferably stored in any of the memory devices contained on the computer. Furthermore, the tree search engine 120 is implemented in a processing unit (which can include one or more processors) or can be performed by a dedicated speech recognition processor employed by the computer.

In the embodiment illustrated in FIG. 1, during speech recognition, speech is provided as an input into system 100 in the form of an audible voice signal by the user to the microphone 92. The microphone 92 converts the audible speech signal into an analog electronic signal which is provided to the A/D converter 101. The A/D converter 101 converts the analog speech signal into a sequence of digital signals, which is provided to the feature extraction module 110. In one embodiment, the feature extraction module 110 is a conventional array processor that performs spectral analysis on the digital signals and computes a magnitude value for each frequency band of a frequency spectrum. The signals are, in one illustrative embodiment, provided to the feature extraction module 110 by the A/D converter 101 at a sample rate of approximately 16 kHz.

The feature extraction module 110 divides the digital signal received from the A/D converter 101 into frames that include a plurality of digital samples. In one embodiment, each frame is approximately 10 milliseconds in duration. The frames are then encoded by the feature extraction module 110 into a feature vector reflecting the spectral characteristics for a plurality of frequency bands. In the case of discrete and semi-continuous Hidden Markov Modeling, the feature extraction module 110 also encodes the feature vectors into one or more code words using vector quantization techniques and a code book derived from training data. Thus, the feature extraction module 110 provides, at its output, the feature vectors (or code words) for each spoken utterance. The feature extraction module 110 provides the feature vector (or code words) of a rate of one feature vector (or code word) approximately every 10 milliseconds.

Output probability distributions are then computed against Hidden Markov Models using the feature vector (or code words) of the particular frame being analyzed. These probability distributions are later used in executing a Viterbi or similar type of processing technique.

Upon receiving the code words from the feature extraction module 110, the tree search engine 120 accesses information stored in the acoustic model 140. The model 140 stores acoustic models such as Hidden Markov Models which represent speech units to be detected by the speech recognition system 100. In one embodiment, the acoustic model 140 includes the senone tree associated with each Markov state in a Hidden Markov Model. The Hidden Markov Model represents, in one illustrative embodiment, phonemes. Based on the senones in the acoustic model 140, the tree search engine 120 determines the most likely phonemes represented by the feature vectors (or code words) received from the feature extraction module 110 and hence representative of the utterance received from the user of the system.

The tree search engine 120 also accesses the lexicon stored in the module 130. The information received by the tree search engine 120 based on its accessing of the acoustic model 140 is used in searching the lexicon storage model 130 to determine a word that most likely represents the code words or feature vector received from the features extraction module 110. Also, the search engine 120 accesses the language model 150, which is illustratively a 60,000 word trigram language model, derived from the North American Business New Corpus. The language model 150 is also used in identifying the most likely word represented by the input speech. The most likely word is provided as output text of the speech recognition system 100.

Although described herein where the speech recognition system 100 uses HMM modeling and senone trees, it should be understood that the speech recognition system 100 can take many forms, and all that is required is that it provide as an output the text spoken by the user.

Figure 2:
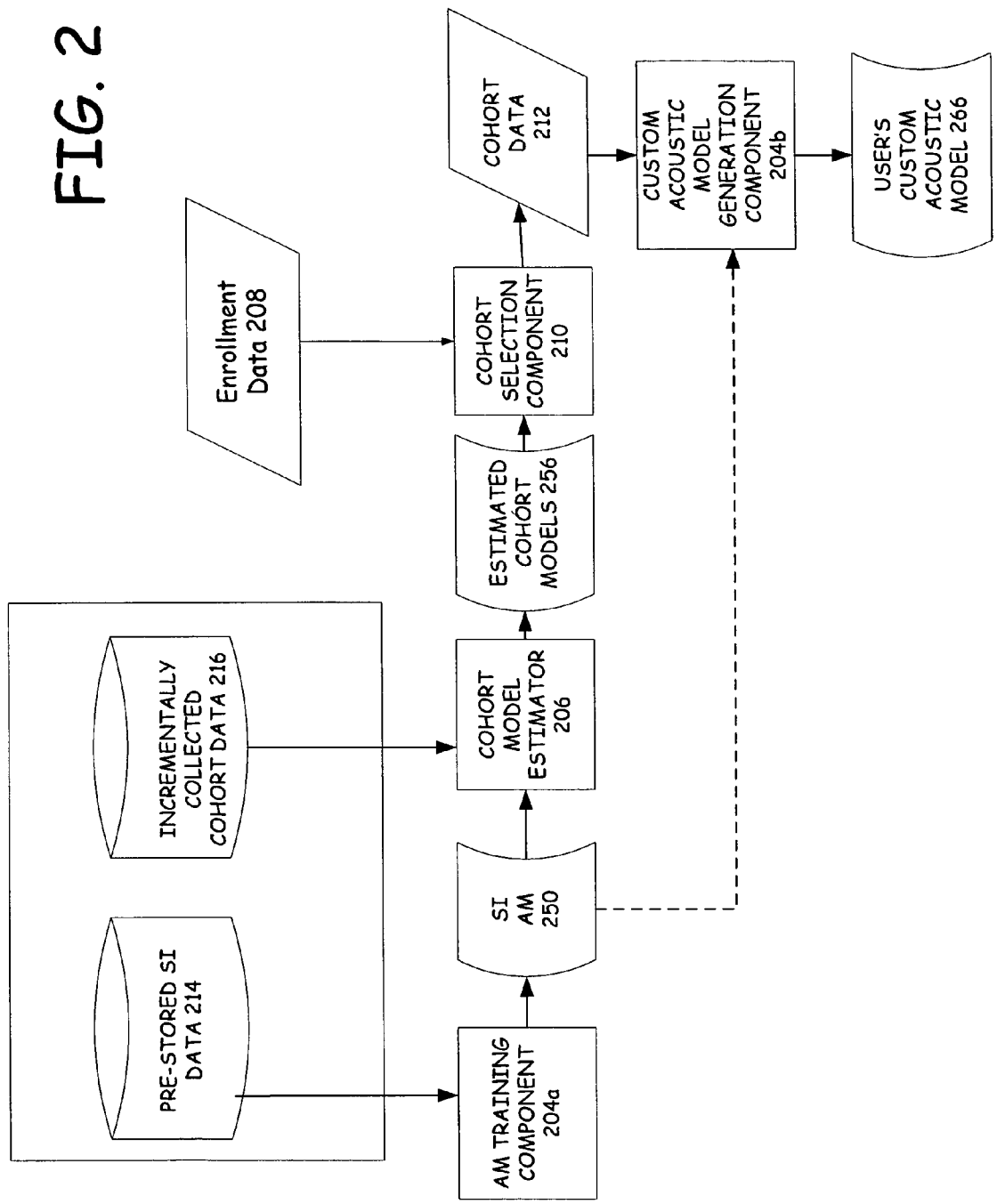
FIG. 2 is a block diagram of a exemplary system used to train acoustic model

FIG. 2 is a detailed block diagram of a system 200 used to train acoustic model 140 in accordance with one illustrative embodiment. In one embodiment, portions of the training process are handled by training module 115 shown in FIG. 1 above. In this embodiment, system 200 can be used to generate a model that is customized to the user. This custom model is an exemplary description only, and other embodiments can use a general model for all speakers, or have a limited number of models to approximate the various general speakers.

System 200 includes a data store 202, and acoustic model training components 204a and 204b. It should be noted that components 204a and 204b can be the same component used by different portions of system 200, or they can be different components. In some embodiments components 204a and 204b are components of training module 115. System 200 also includes a model estimator 206, enrollment data 208, selection component 210 and optionally cohort data 212, which is data corresponding to selected cohort models.

FIG. 2 also shows that data store 202 includes pre-stored data 214 as well as incrementally corrected data 216. Pre-stored data 214 may illustratively be a wide variety of commercially available data sets which includes acoustic data and transcriptions indicative of input utterances. One example of the commercially available data can be the TIDIGITS corpus discussed later. The incrementally collected data 216 can include, for example, data from additional speakers which is collected at a later time. Enrollment data 208 is illustratively a set of three sentences, for example, collected from a user. In training the acoustic model, the acoustic model training component 204a accesses the pre-stored data 214 and trains the acoustic model 250. The user inputs for these samples are then received in the form of the enrollment data 208. Illustratively, enrollment data 208 not only includes an acoustic representation of the user input of the enrollment data, but an accurate transcription of the enrollment data as well. This transcription can be obtained by directing a user to speak a predetermined sentences or number string, and verifying they spoke the sentences or number string. Thus, it is possible to know exactly what words corresponded to the acoustic data. Alternatively, other methods of obtaining the transcription can be used as well. For example, the user's speech input to the speech recognition system can be input to the speech recognition system 100 to obtain the transcription.

Model estimator 206 then assesses intermittently collected data 216 which is data from a number of different speakers that may be used for cohort speakers. Based on the acoustic model 250 and the data 216, model estimator 206 estimates a plurality of different models 256.

Each possible model 256 is provided to the selection component 210. The selection component 210 compares the input samples (enrollment data 208) to the estimated models 256. The selection component 210 then selects the speakers that are closest to the enrollment data 208. This can be done using cohorts or any other predetermined similarity measure. Using this data 212, the acoustic model generation component 204b generates an $S_r$ acoustic model 266.

In order to determine the best acoustic model using the available training data, the training system 200 uses minimum classification error (MCE) or similar discriminative training algorithms in developing the acoustic model 140. Conventional MCE learning minimizes the smooth sentence or string level error rate that is commonly associated with acoustic model training. In the present embodiments r=1, . . . ,R is used as an index for a token or string (e.g., a single sentence or utterance) in the training data 214. Each token consists of a "string" of a vector valued observation sequence ($X_r = x_{r,1}, \ldots, x_{r, T_r}$) with the corresponding label (word) sequence ($S_r = w_{r,1}, \ldots, w_{r,N_r}$.) That is, $S_r$ denotes the correct label sequence for a token r. For the present embodiments use $s_r$ to denote all possible label sequences for the r token, including the correct label sequence as $S_r$ and all other incorrect label sequences. These correct and incorrect label sequences are useful in determining the relative closeness or accuracy of the acoustic model.

In MCE, a loss function for a single utterance $X_r$ is defined. An advantage to using a loss function is it has the property that its solution is close to zero if the string is correctly recognized and is close to one if the string has been incorrectly recognized. One example of a smooth function that achieves the property for the loss function is represented in the following sigmoid function.

$$l_r(d_r(X_r, \Lambda)) = \frac{1}{1 + e^{-\alpha d_r(X_r, \Lambda)}} \qquad \text{Equation 1}$$

In Equation 1 it is assumed that α=1 for simplicity in the exposition without a loss of generality. In Equation 1 $d_r(X_r,\Lambda)$ is also referred to as the misclassification measure, and $\Lambda$ is the model parameter to be trained. For example, in one best MCE training only the top incorrectly recognized string is used as a "competitive candidate" for discriminative training, $d_r(X_r,\Lambda)$ is the log likelihood distance between the correct string $S_{r,c}$ and the incorrect competitive string. That is represented as Equation 2.

$$d_r(X_r,\Lambda) = -\log p_\Lambda(X_r,S_{r,c}) + \log p_\Lambda(X_r,S_{r,e}) \quad \text{Equation 2}$$

Next Equation 2 is substituted into Equation 1 and results in Equation 3.

$$l_r(d_r(X_r,\Lambda)) = \frac{p_\Lambda(X_r,S_{r,e})}{p_\Lambda(X_r,S_{r,e}|\Lambda) + p_\Lambda(X_r,S_{r,c}|\Lambda)} \quad \text{Equation 3}$$

For more general N-best MCE training where the top N>1 incorrectly recognized strings are used as the competitive candidates, a soft-maximization function has been widely used. One example of this function is illustrated by Equation 4.

$$d_r(X_r,\Lambda) = -\log p_\Lambda(X_r,S_r) + \log\left\{\frac{1}{N-1}\sum_{s_r,s_r \neq S_r} \exp[\eta \log p_\Lambda(X_r,s_r)]\right\}^{\frac{1}{\eta}} \quad \text{Equation 4}$$

The present embodiments have been approximated as a misclassification measure using a simpler form as illustrated by Equation 5 where $w_{MCE}(s_r)$ is a non-negative weighting factor for the competitive string $s_r$.

$$d_r(X_r,\Lambda) = -\log p_\Lambda(X_r,S_r) + \log \sum_{s_r,s_r \neq S_r} w_{MCE}(s_r)^\times p_\Lambda(X_r,s_r) \quad \text{Equation 5}$$

This results in a loss function for the N-best version of MCE becoming Equation 6, below, where the assignment of $w_{MCE}(s_r)=1$ is used for the correct string $S_r$.

$$l_r(d_r(X_r,\Lambda)) = \frac{\sum_{s_r,s_r \neq S_r} w_{MCE}(s_r) p_\Lambda(X_r,s_r)}{\sum_{s_r} w_{MCE}(s_r) p_\Lambda(X_r,s_r)} \quad \text{Equation 6}$$

where $w_{MCE}(s_r)$ is a weighing factor of $s_r \neq S_{r,c}$

Next, in the MCE, the loss function at the super-string level is defined to be a sum of the loss functions of all individual string tokens. A super-string is a complete representation of the entire string used for training. This loss function is illustrated by Equation 7.

$$L_{MCE}(\Lambda) = \sum_{r=1}^{R} l_r(d_r(X_r,\Lambda)) \quad \text{Equation 7}$$

Next the present embodiment minimizes the super-string level loss function of the $L_{MCE}(\Lambda)$ is equivalent to the maximization of the following objective function illustrated as Equation 8.

$$O_{MCE}(\Lambda) = R - L_{MCE}(\Lambda) = \sum_{r=1}^{R} \frac{p_\Lambda(X_r,S_{r,c}|\Lambda)}{\sum_{s_r} w_{MCE}(s_r) p_\Lambda(X_r,s_r)} \quad \text{Equation 8}$$

The present embodiments implement an MCE algorithm that maximizes Equation 8, not through the use of the gradient ascend, as in the prior art, but by a special technique of optimization via growth transformation. This implementation results in an improved version of previous versions of this equation. The improvement lies in converting the super-string level objective function of the previous research into a normal string level objective function for MCE. This conversion is accomplished via a non-trivial mathematical framework, which results in a rational function that is then subject to optimization by growth transformation or an extended Baum-Welch algorithm. This framework requires the approximation of Equation 5 to the misclassification measure. In the present embodiments, using the growth transformation based optimization discussed below four iterations are sufficient to achieve empirical convergence. This is in contrast to the 40 or more iterations that are usually required by the gradient ascend method.

Figure 3:
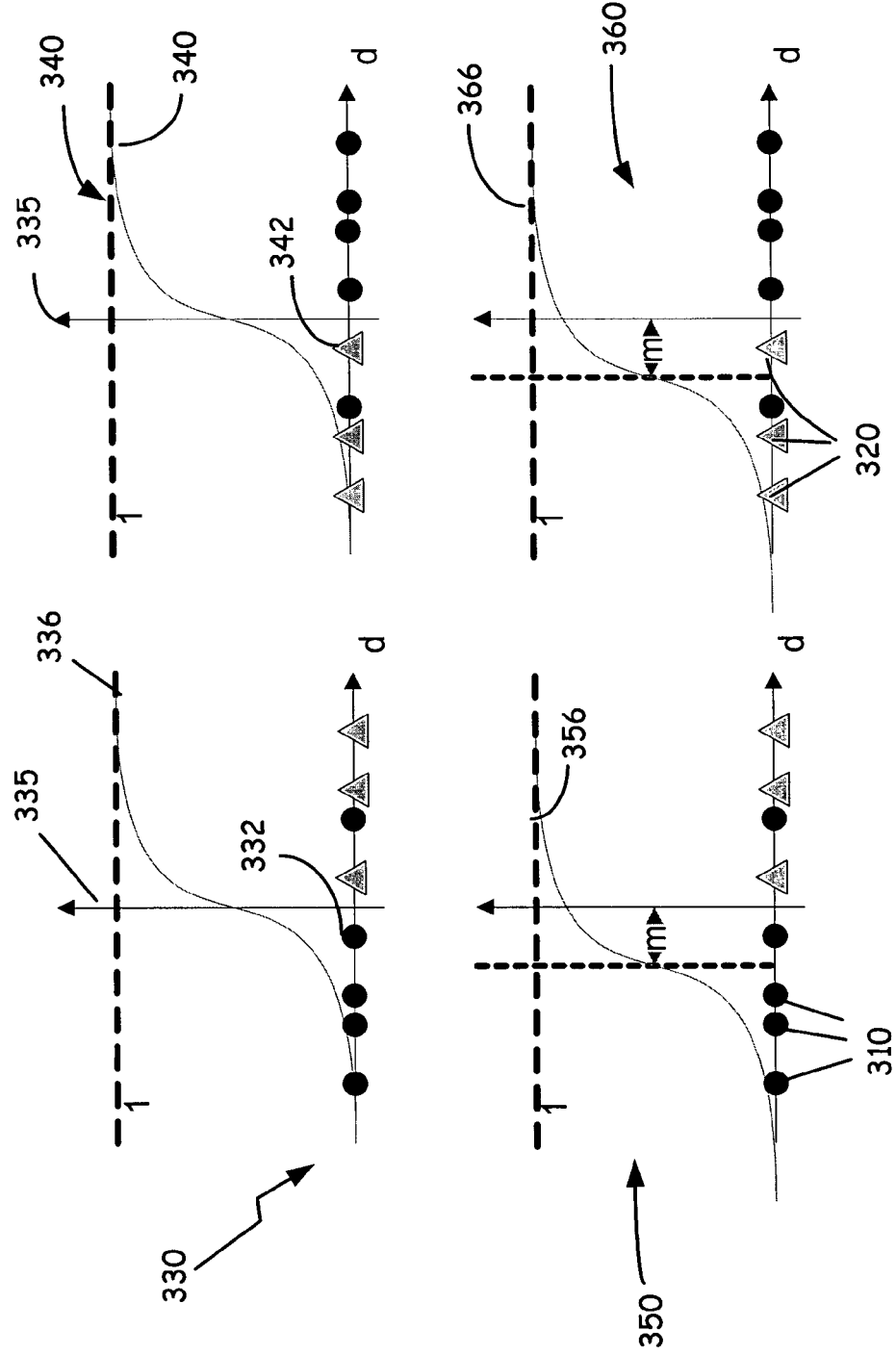
FIG. 3 is an example series of plots of sigmoid functions illustrating the MCE results for given tokens with and without the margin.

Referring now to FIG. 3, FIG. 3 is a series of plots illustrating the MCE results for given tokens in a class as a function of d. Given a fixed classifier or recognizer which defines decision boundaries for all possible pairs of classes, a margin is defined for each training token as a difference between the score of the token by the correct class and that by the most competitive class. A positive difference gives a positive sample, and a negative difference gives a negative sample. A large (i.e., positive) margin implies a wide tolerance gap. A recognizer with a large margin gives more robust discrimination than that with a smaller margin. However, it may not give lower empirical error rates in the training data, especially for multi-class tasks such as speech recognition.

The concept of a margin interpreted as a tolerance gap is incorporated into the MCE calculation by using a negative incrementally adjusted parameter β(I)<0 in the more generalized definition of the loss function illustrated by Equation 1. By adding this margin into Equation 1 results in an additional exponential component to the denominator of Equation 1. This is illustrated in Equation 9.

$$l_r(d_r(X_r,\Lambda)) = \frac{1}{1 + e^{-\alpha d_r(X_r,\Lambda) + \beta(I)}} \quad \text{Equation 9}$$

In essence, in the conventional MCE calculation, β has been set to zero. By setting β to zero Equation 9 reverts back to Equation 1. However, as the margin provided by β(I) is a component of loss function in Equation 9, it is possible to determine the empirical discrimination pattern. This is referred to as a discriminative margin.

In Equation 9, the "iteration" argument I of β(I) signifies that the actual value of β at iteration I is regulated by incremental adjustments from a smaller negative value to a larger one. Small negative values of β in early iterations provide small margins while not sacrificing a significant reduction in empirical errors in training. Once the error pattern adjusts to the new error pattern for each iteration, an increment of β from β(I) to β(I+1) at the next iteration will have a similarly small effect on the empirical errors while achieving relatively larger margins that help reduce test errors. Further, incrementally adjusted margins help bring incorrectly classified training tokens that are far away from the center of the sigmoid function across the center faster than without using such margins. This is because the slopes of the sigmoid corresponding to these tokens are small and thus would be moved slowly by traditional MCE without incremental margins.

FIG. 3 illustrates a two-class special case for the use of discriminative margins in MCE. Tokens shaped as circles 310 are from class 1 and those represented as triangles 320 are from class 2. The graphs of the sigmoid function without a margin illustrated by 330 and 340 for classes 1 and 2, respectively, as currently achieved in conventional MCE, the circle token 332 near d=0 for class 1 will contribute to the model adjustment since it incurs some loss and it is near the decision boundary 335 where the slope of the sigmoid function 336 is large. However, after model adjustment which moves that token to the left, the slope of the sigmoid 336 becomes significantly smaller and hence model adjustments stop. An identical process applies to the triangle tokens 342 near the d=0 decision boundary 345 for class 2 in plot 340.

After the margin is introduced as illustrated by the lower figures in 350 and 360 in FIG. 3, a shift in the sigmoid function 356, 366 to the left of the magnitude m for both the circle tokens 310 and the triangle tokens 320 can be moved to the left over the distance at least m units longer than in the earlier example. Further, when the shift of the sigmoid function is done incrementally, a greater final distance or discriminative margin can be achieved.

An example of the implementation of the techniques described above is illustrated below using a TIDIGITS corpus. This is done in a standard experimental setup that is consistent with previous approaches on this task. The TIDIGITS corpus contains utterances from 326 speakers (111 men, 114 women, and 101 children) that were collected from 21 distinct regions of the United States. There are a total of 11 words (digits) in this corpus vocabulary. Specifically the digits of 1 through 9 plus zero and the word "oh" representing an alternative pronunciation of the word zero. Each utterance is a connected digit string, with the number of digits in the string varying between 1 and 7. However, in the TIDIGITS corpus, there are no 6 digit strings. In the present example, only the adult portion of the corpus issues that makes up the standard training set of 8623 digit strings and a standard test set of 8700 digit strings.

In this example, the data was sampled at a rate of 16 kHz. Thirty-three dimensional acoustic vectors were composed of the normalized energy of 10 Mel-Frequency Cepstrum Coefficients (MFCC) and their first and second order time derivatives. In this example, the models used are head-body-tail CDHMM's with a different number of Gaussian mixture components for each state. This results in a total number of Gaussian mixture components used in this example of 3284, which is roughly the same as typically appears in a nine-state whole word CDHMMs with 32 Gaussian mixtures per state. These models were then trained using the Maximum Likelihood (ML) criterion. Then, MCE training methods discussed above, with and without incorporation discriminative margins are applied. Both were applied using the ML-trained models to initialize the MCE training. In this example, the word error rate and string error rate in the test set using the initial ML-trained models are 0.28% and 0/78%, respectively, using tuned insertion penalty of −14.5 and a language model weight of −13.25. During this MCE training, a value in Equation 9 was tuned to be 1/120, and all HMM model parameters (except transition probabilities) were updated. The setting in this example gives the best MCE baseline (i.e., no discriminative margin used or β(I)=0), with a word error rate of 0.23% and a string error rate of 0.68%. This represents the 17.86% relative word error rate reduction and 12.82% relative string error rate reduction over the initial ML-trained models.

TABLE 1

Summary of the Experimental Results

| | WER | | SER | |
|---|---|---|---|---|
| Margin | Absolute | Relative reduction | Absolute | Relative Reduction |
| B = 0 | 0.23% | Baseline | 0.68% | Baseline |
| Method 1 | 0.20% | 13.04% | 0.57% | 16.18% |
| Method 2 | 0.20% | 13.04% | 0.57% | 16.18% |
| Method 3 | 0.19% | 17.39% | 0.55% | 19.12% |

Next, the digit HMMs are trained in initializing from the ML models with incrementally regulated discriminative margins β(I)<0 in the MCE training paradigm. In this example, α remains the same at 1/120 and the calculations continue using three different methods for setting the equation that regulates β(I). These three methods were evaluated under otherwise identical experimental conditions.

Figure 4:
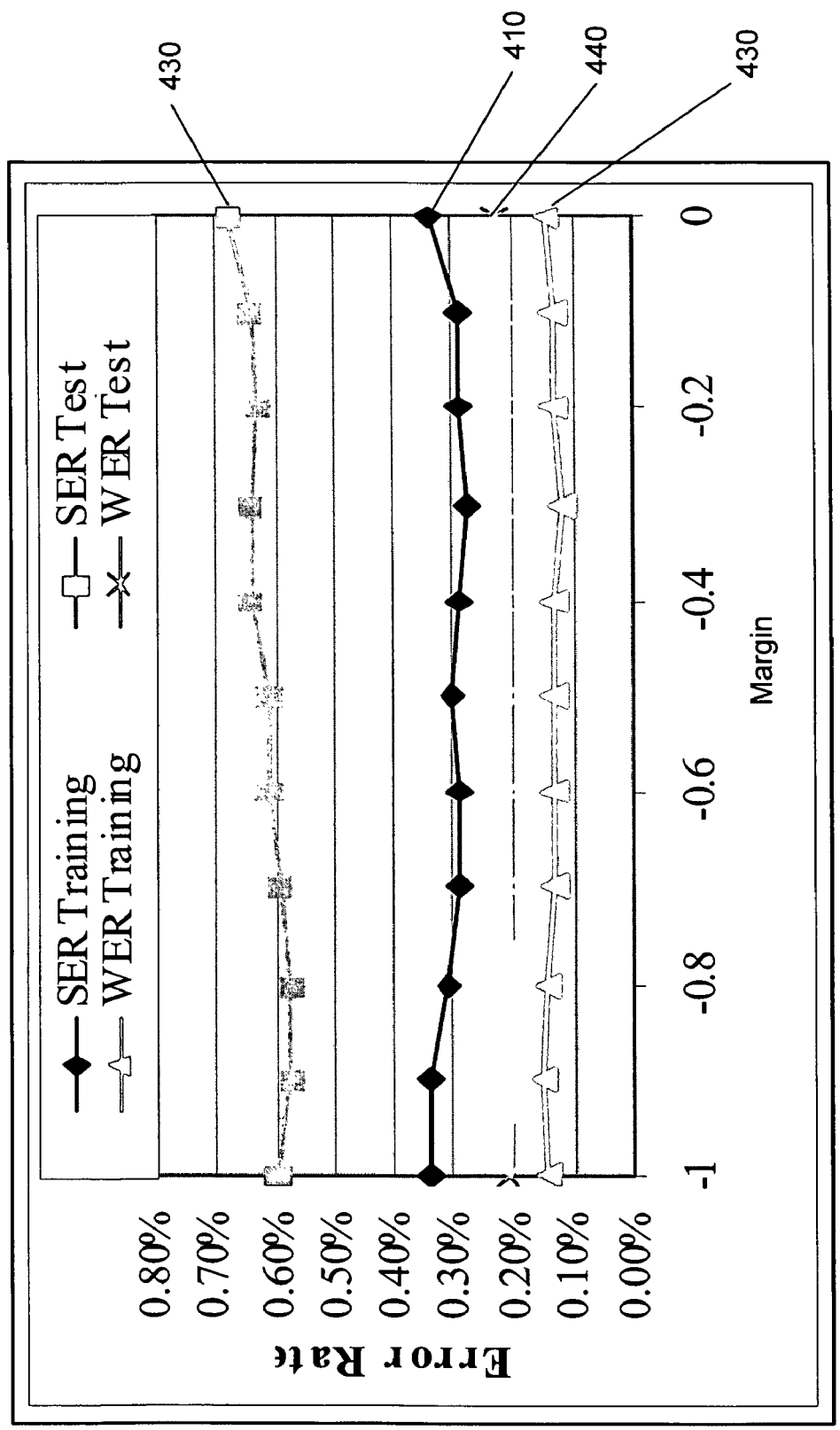
FIG. 4 is a plot of recognition error rates during an example training and testing where the margin is fixed.

In the first method, β(I) is set to a fixed value over the range of [−1, 0] in all iterations. That is, β(I) is set to be independent of the iteration number I. This resulted in an optimal result when setting β(I)=−0.8. The results are plotted in FIG. 4, where the recognition error rates (WER and SER) are shown as a function of the fixed margin value over MCE training iterations. These error rates for the training and test sets are plotted separately. In FIG. 4, line 40 represents the SER in training, line 420 represents the WER in training, line 430 represents the SER in testing and line 440 represents the WER in testing. The initial HMMs for the MCE training with each of the fixed β margin values are from the ML training. A total of 15 MCE growth-transformation iterations are used for each of the fixed β values.

Figure 5:
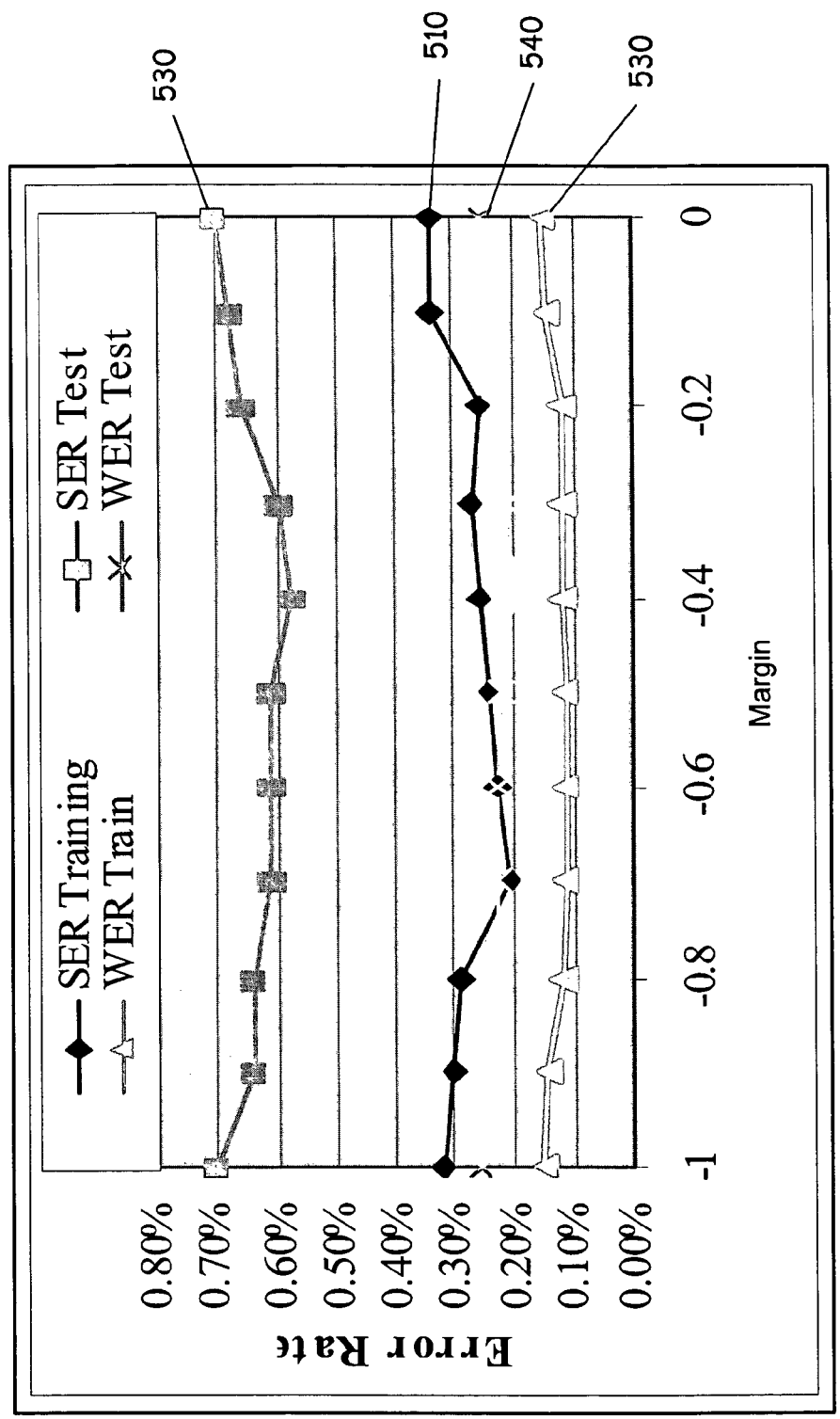
FIG. 5 is a plot of recognition error rates where the margin increments from zero to −1.

In the second method, the margin β(I) is designed to change from neutral (no margin or β=0) to a margin of β=−1, with a step size of −0.1 during the MCE. That is, β(I)=−0.1*(I-1), for I=1, . . . ,11. FIG. 5 shows the WER and SER results (for both training and test sets) as a function of the incrementally reduced margin value. In FIG. 5, line 510 represents the SER in training, line 520 represents the WER in training, line 530 represents the SER in testing and line 540 represents the WER in testing. When the margin equals zero (as indicated by 511 in FIG. 5) the HMMs are initialized in the MCE training (4 iterations) from the ML-trained models. As the margin becomes incrementally reduced for iterations 1 to 11, the previously MCE-trained models serve as the initial models for each iteration and the additional 4 MCE iterations are used for each new margin value.

Figure 6:
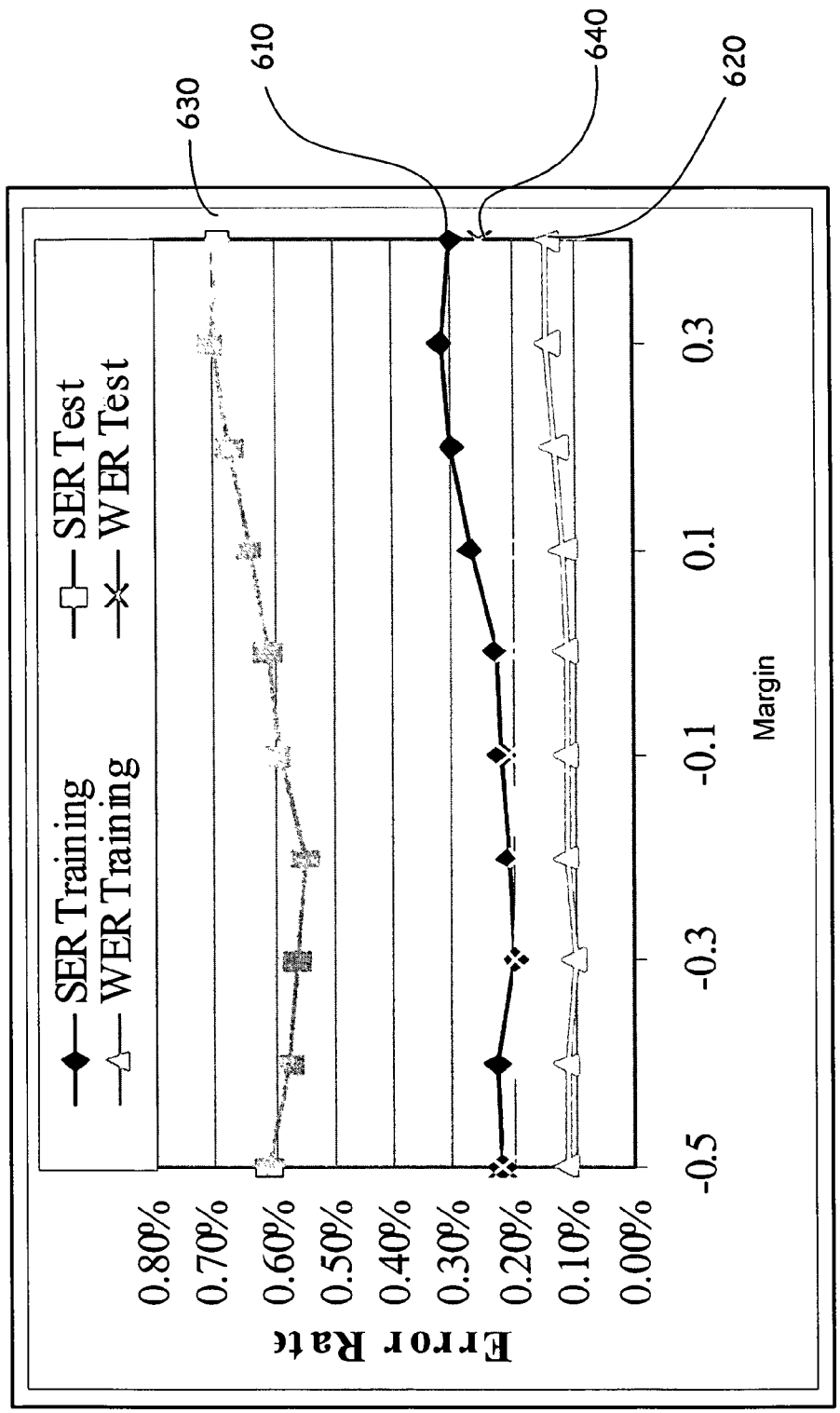
FIG. 6 is a plot of recognition errors rates where the margin increments from 0.4 to −0.5.

In the third method, the margin is set to change from 0.4 to −0.5, having a step size of −0.1 as well. In other words, β(I)=0.4−0.1*(I-1), for I=1, . . . ,10. FIG. 6 illustrates the results of this calculation in a format similar to the format discussed above with respect to FIGS. 4 and 5. In FIG. 6, line 610 represents the SER in training, line 620 represents the WER in training, line 630 represents the SER in testing and line 640 represents the WER in testing. However, the results in FIG. 6 show slightly lower errors.

An examination of the results in FIGS. 4-6 reveals a consistent trend related to the effects of increasing discriminative margin on the recognition errors. As the margin is enlarged, the number of errors tends to be reduced and then reverse the direction as the margin further increases. Thus, the largest margin does not correspond to the lowest error.

FIG. 4-6 also illustrates that the lowest test error rates do not always occur at the same margin value. The overall results using the three methods discussed above were summarized in Table 1 above. In this table, the relative error rate reduction is calculated based upon the MCE baseline where the discriminative margin is set to zero. Thus, we observe a 13.04% relative word error rate reduction and a 16.18% relative string error rate reduction over the baseline MCE models using the methods illustrated in FIGS. 4 and 5. However, by using the method illustrated in FIG. 6, the results achieved a 0.19% absolute word error rate and 0.55% absolute string error rate. This translates into a 17.39% relative word error rate reduction and a 19.12% relative string error rate reduction over the MCE baseline. This result far exceeds previous error rates that have been observed using standard MCE.

Figure 7:
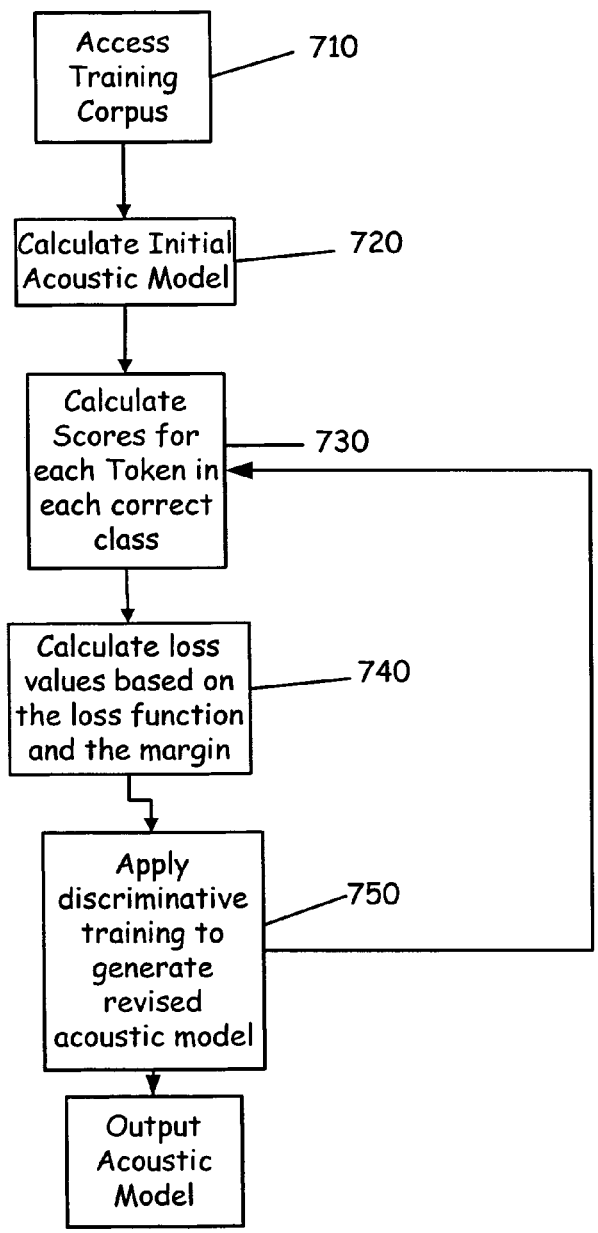
FIG. 7 is a flow diagram illustrating the steps executed during training of the acoustic model according to one embodiment.

In conclusion, referring now to FIG. 7, a flow diagram is provided to briefly illustrate a process that is employed by one embodiment to train the acoustic model. First a training data corpus is accessed or otherwise provided to the training module 115. This is illustrated at step 710. Then the training module 115 calculates an initial acoustic model using the training corpus. This is illustrated at step 720. Once the initial acoustic model is created the system calculates scores for each token with regard to the correct class and the competing classes from the initial acoustic model. The calculation of this score can in some embodiments be accomplished through the use of Equation 4, above. This is illustrated at step 730. Once the scores have been calculated a value for the loss function is calculated based on Equation 9 above, including a value for the margin. This is illustrated at step 740. As discussed above the margin can be a fixed value, or can vary over each iteration of the training process. Once the value for the loss function has been calculated the parameters in the initial acoustic model are updated to create a revised acoustic model. This is illustrated at step 750. Steps 730 to 750 are repeated until either a predetermined number of iterations have passed or empirical convergence is achieved. Once the process is finished the final revised acoustic model is output at step 760.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of training an acoustic model in a speech recognition system, comprising:
    accessing a training corpus;
    using the training corpus to calculate model parameter values for an initial form of an acoustic model;
    a processor iteratively updating model parameter values for the acoustic model, each iteration comprising:
        calculating a plurality of scores for each token with regard to a correct class and a plurality of competing classes from a set of model parameter values determined for the acoustic model before the iteration;
        determining a value for a loss function based on the calculated scores and a margin wherein the loss function is computed as:

$$l_r(d_r(X_r, \Lambda)) = \frac{1}{1 + e^{-\alpha d(X_r, \Lambda) + \beta(I)}};$$

where $l_r(d_r(X_r,\Lambda))$ is the value for the loss function, $d_r(X_r, \Lambda)$ is a misclassification measure for a token $X_r$, determined from the plurality of scores for the token $X_r$, $\Lambda$ represents the set of model parameter values for the acoustic model, $\alpha$ is a constant, $\beta(I)$ is the margin, and I is an iteration argument, wherein for at least two different iterations that form part of iteratively updating model parameter values for a same acoustic model, the value of $\beta(I)$ is different;
    updating the set of model parameter values to create a revised set of model parameter values based upon the value of the loss function; and
    outputting the a final revised set of model parameter values for the acoustic model.

2. The method of claim 1 further comprising:
    iteratively updating the set of model parameter values until an empirical convergence has been met for the set of model parameter values.

3. The method of claim 2 wherein the empirical convergence occurs after four iterations.

4. The method of claim 1 where four iterations are performed for each value of $\beta(I)$.

5. A system for training an acoustic model comprising:
    a training corpus;
    a training component; and
    wherein the training component is configured to iteratively generate the acoustic model based on the training corpus and a loss function wherein the loss function is defined as $$l_r(d_r(X_r, \Lambda)) = \frac{1}{1 + e^{-\alpha d_r(X_r, \Lambda) + \beta(I)}};$$

where $d_r(X_r,\Lambda)$ is a misclassification measure, $\alpha$ is a constant, $\beta(I)$ is a margin, I is an iteration argument, $X_r$ is a string vector, r is an index and $\Lambda$ represents model parameters of the acoustic model, wherein at least two different iterations represented by two different respective values of the iteration argument use two different values for $\beta(I)$ in the loss function.

6. The system of claim 5 further comprising:
    speaker independent data; and
    wherein the training component is configured to use the speaker independent data in conjunction with the training corpus to generate the acoustic model.

7. The system of claim 6 wherein the training component generates a custom acoustic model for each speaker.

8. The system of claim 5 wherein the training component comprises two separate acoustic model training components.

9. The system of claim 5 where four iterations are performed for each value of $\beta(I)$.

10. The system of claim 5 wherein the training component is configured to iteratively generate the acoustic model until an empirical convergence is achieved.

11. A speech recognition system configured to recognize a spoken utterance, comprising:
    a feature extraction module;
    a training module;
    a search engine;

a lexicon;
a language model;
an acoustic model; and
wherein the acoustic model is iteratively trained based on a training data set and a computed misclassification measure processed through a loss function that includes a margin, wherein the loss function is defined as $$l_r(d_r(X_r, \Lambda)) = \frac{1}{1 + e^{-\alpha d_r(X_r, \Lambda) + \beta(I)}}$$

where $d_r(X_r, \Lambda)$ is a misclassification measure, $\alpha$ is a constant, $\beta(I)$ is a margin, I is an iteration argument, $X_r$ is a string vector, r is an index and $\Lambda$ represents model parameters of the acoustic model, wherein different iterations use two different values for $\beta(I)$ in the loss function.

12. The speech recognition system of claim 11 where four iterations are performed for each value of $\beta(I)$.

* * * * *